UNITED STATES PATENT OFFICE.

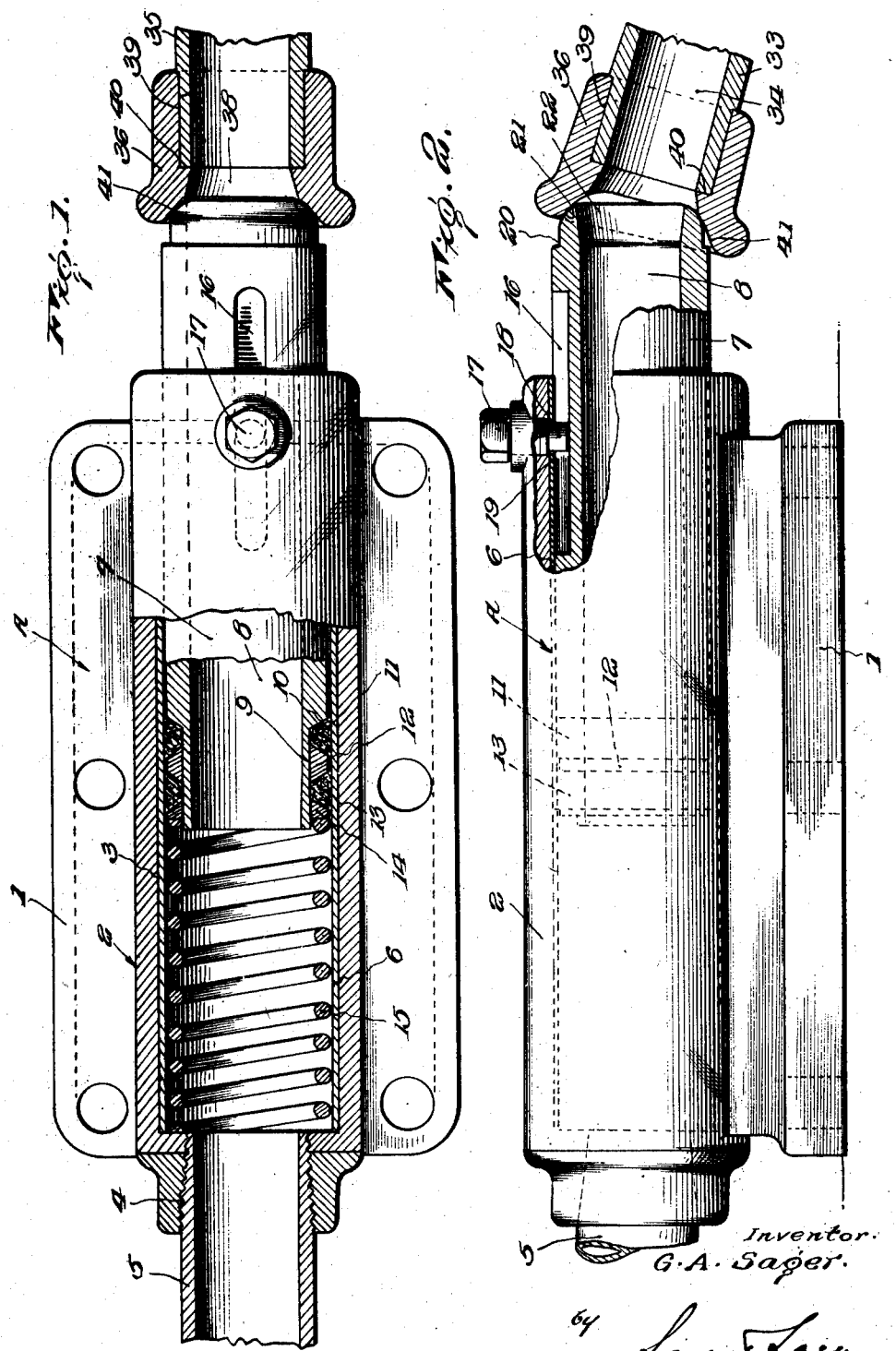

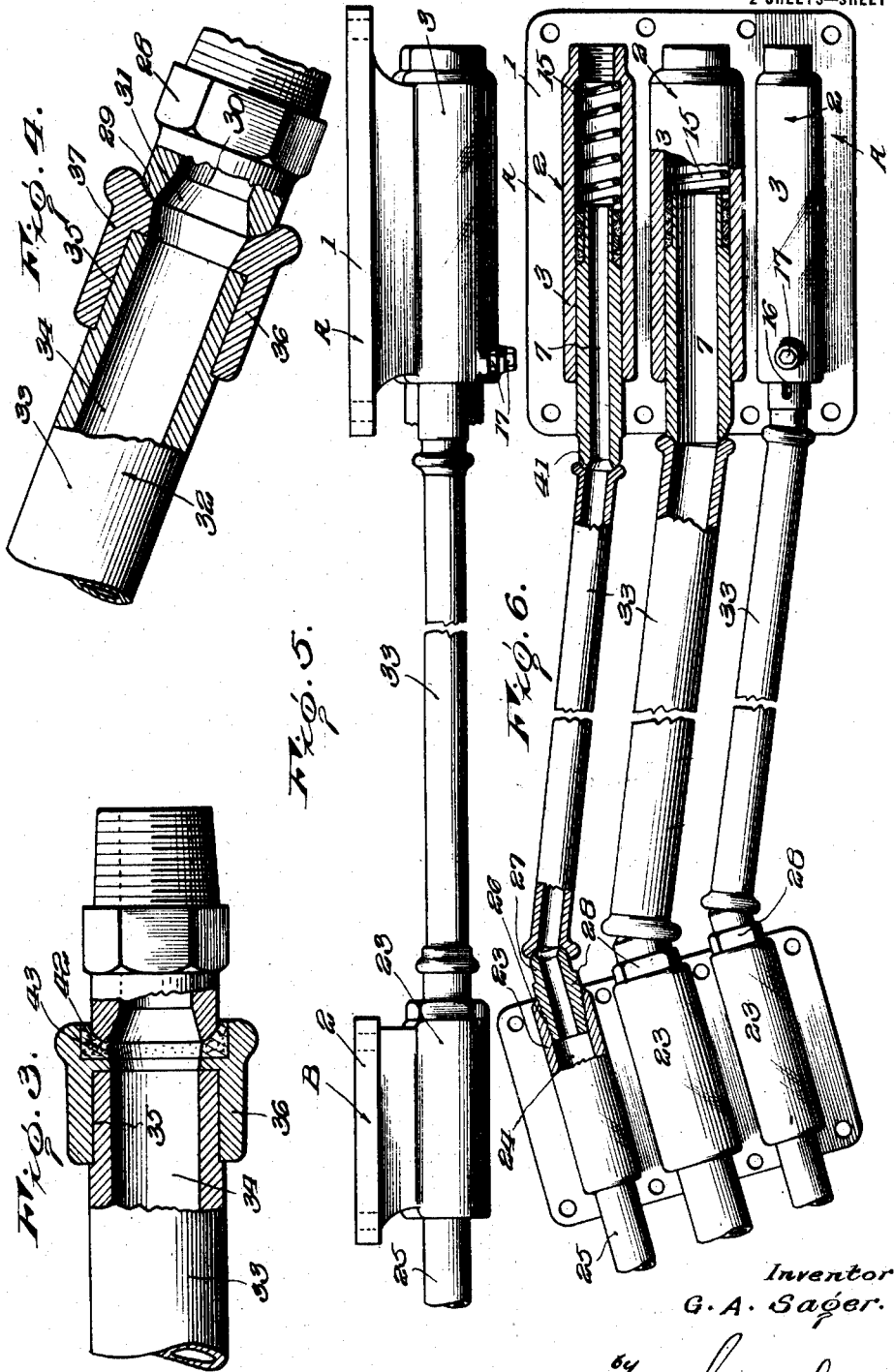

GEORGE A. SAGER, OF ALBANY, NEW YORK.

TRAIN-PIPE COUPLING.

1,365,730. Specification of Letters Patent. Patented Jan. 18, 1921.

Application filed November 24, 1919. Serial No. 340,162.

*To all whom it may concern:*

Be it known that I, GEORGE A. SAGER, a citizen of the United States, residing at Albany, in the county of Albany and State of New York, have invented certain new and useful Improvements in Train-Pipe Couplings, of which the following is a specification.

This invention relates to train pipe couplings for establishing connection between the steam, air, and oil service pipes either singly or collectively and the coupling is designed principally for employment between the locomotive and its tender although not restricted to use in this particular location.

One of the objects of the present invention is to dispense with the use of flexible hose connections and the like which are costly to maintain and which are a frequent source of trouble because of leakage and for other reasons, and to provide, in lieu of such connections a straight line metallic connection which will possess none of the disadvantages of the old types of couplings and will on the other hand present numerous advantages not to be found in the latter.

The coupling embodying the present invention includes in its structure a casting in which is telescopically fitted a pipe section yieldably held projected through the medium of a spring housed within the casting, and one object of the present invention is to provide novel means for limiting the sliding movement of the pipe section within the casting and at the same time preventing rotation of the said section.

A further object of the invention is to provide a novel packing device for rendering the engagement of the pipe section within the casting fluid-tight, which packing device will be acted upon by the spring above mentioned and which yieldably holds the pipe section projected so that this spring serves not only the purpose of holding the pipe section in its projected position but also serves as a means for compressing and maintaining the packing in tight contact with the surface of the bore of the casting.

Another object of the invention is to so construct the coupling that the coupling section or sections will be securely held against disengagement or accidental dropping out of place and yet may be readily released and replaced whenever required and without the use of tools.

A further object of the invention is to provide a novel form of union between the relatively fixed members of the coupling and the ends of the coupling section which union will be of such a nature as to insure of a fluid-tight connection notwithstanding the angular displacement to which the parts are subjected due to relative movement of the locomotive and tender or the other components of a train between which the coupling is employed.

A still further object of the invention is to provide for a fluid-tight union between the parts regardless of variation in pressure in the service pipes.

The invention has as a still further object to so construct the coupling sections that accidental dropping or other rough handling of the sections will not be liable to so scar or injure the bearing surfaces thereof as to impair the fluid-tight union of the ends of the section with the relatively fixed members of the coupling.

In the accompanying drawings:

Figure 1 is a view partly in bottom plan and partly in horizontal section illustrating a portion of the coupling embodying the present invention;

Fig. 2 is a side elevation partly in section of the structure shown in Fig. 1;

Fig. 3 is a view partly in side elevation and partly in longitudinal section illustrating a modified form of the coupling;

Fig. 4 is a view similar to Fig. 3 illustrating a portion of the coupling;

Fig. 5 is a side elevation illustrating a modified form of coupling.

Fig. 6 is a view partly in bottom plan and partly in horizontal section illustrating the structure shown in Fig. 5.

Briefly stated, the coupling comprises two coupling heads one of which is to be secured to a convenient portion of the locomotive and the other to a convenient portion of the locomotive tender, where the coupling is employed in this particular location, one or a plurality of coupling sections being provided between the two heads so as to establish communication between a corresponding number of service pipe lines. For example, in the form of the invention shown in Figs. 1 and 2 of the drawings, the invention is employed in connection with a single pipe line, whereas in the form illustrated in Figs. 5 and 6, the same is employed in connection with a plurality of pipe lines adapted for example to separately conduct oil, air and steam. Inasmuch as except for duplication of parts, the construction of the two forms is identical, corresponding parts in all of the figures are indicated by like reference numerals.

The coupling head which is to be mounted upon the locomotive is indicated in general by the reference character A and the head which is to be mounted upon the tender is indicated by the reference letter B. These heads are provided with suitable attaching base portions indicated respectively by the numerals 1 and 2 by means of which the heads may be secured to the parts of the locomotive and tender by which they are to be respectively supported.

The head A comprises, in addition to its attaching base portion 1, a hollow cylindrical body or barrel 2 the bore of which is indicated by the numeral 3 and is reduced in diameter at one end and interiorly threaded as at 4 to receive the end of the service pipe 5. In the form of the invention shown in Figs. 1 and 2, the head A embraces but a single one of the bodies 2 whereas in the form shown in Figs. 5 and 6 there are several, for example three, of these bodies provided upon the attaching base portion of the head and in this latter instance the service pipes for air, steam, and oil will be connected with respective ones of the bodies 2 as most clearly shown in Fig. 6. The bore 3 of the body 2 is of uniform diameter from its above mentioned end to its opposite end and there is fitted within the bore a cylindrical lining 6 of any suitable non-corrosive metal such for example as bronze. Telescopically slidably fitted in the bore 3 of the body 2 or more specifically within the lining or bushing 6 thereof, is a pipe section indicated by the numeral 7, the bore of this section, indicated by the numeral 8, being substantially of the same diameter as the bore of the service pipe 5. This pipe section 7 is exteriorly reduced in diameter as indicated by the numeral 9 at its end which fits within the bore of the body 2 and in reducing the said end of the pipe section a circumscribing inclined or beveled shoulder 10 is provided inwardly of the extremity of the section. A packing gasket 11 of any suitable packing material such as leather, vulcabeston or the like, is fitted onto the reduced end 9 of the pipe section 7 and at one side against the shoulder 10. A ring 12 having its opposite sides beveled, is next fitted onto the reduced end of the pipe section and at one side bears against the other face or side of the gasket 11, the gasket being preferably beveled inwardly to correspond to the bevels of the shoulder 10 and the face of the ring 12. A second packing gasket 13 is next fitted onto the reduced end of the pipe section and against the other side of the ring 12, and finally a ring 14 is fitted onto the reduced end of the said pipe section and bears against the other side of the gasket 13, this gasket 13 being beveled as in the case of the gasket 11 as likewise is the face of the ring 14. A spring 15 is disposed within the bore of the body 2 and bears at one end against the shoulder formed by reducing the end of this bore and at its other end engages around the reduced extremity of the pipe section 7 and bears against the last mentioned ring 14. The pressure exerted by the spring 15 serves not only to yieldably hold the pipe section 7 in a projected position, but also serves to cause the rings 12 and 14 to exert pressure against the gaskets 11 and 13, and due to the beveled faces of these gaskets and rings and the bevel face of the shoulder 10, the gaskets will be expanded to snugly contact the inner surface of the lining or bushing 6 so as to maintain a fluid-tight connection between the interior of the body 2 and the pipe section 7. It will thus be seen that the spring 15 performs a dual function and that wear of the gaskets 11 and 13 is automatically taken up because of the peculiar arrangement of these gaskets and the rings 12 and 14. It will also be evident that should it at any time become necessary to replace the gaskets, this may be readily accomplished after the pipe section 7 has been removed or withdrawn from the bore of the body 2.

In order to limit the sliding movement of the pipe section 7 within the bore of the body and also for the purpose of retaining the lining or bushing 6 within the bore of the body, means is provided which will now be described. The pipe section 7 is formed exteriorly near its outer end with a longitudinally extending groove which is indicated by the numeral 16. A stud screw 17 is threaded through the wall of the bore of the body 2 and is provided with a plain or unthreaded end 18 which fits through an opening 19 formed in the lining or bushing 6 and projects into the groove or channel 16 as most clearly shown in Fig. 2 of the drawings, the diameter of the end 18 of the screw being substantially equal to the width of the groove 16 so that the engagement of the side walls of the groove against the opposite sides of this end of the screw will prevent rotation or turning of the pipe section 7 within the bore of the body 2 and the engagement of the end walls of the groove with the said end of the screw will, as before stated, limit the sliding movement of the pipe section within the bore of the body. Of course, the engagement of the end of the screw through the opening 19 in the bushing or lining 6 will effectually serve to retain the lining or bushing within the bore of the body 2 so that there will be no likelihood of displacement of this element being caused through sliding movement of the pipe section therein.

At its outer end the pipe section 7 is exteriorly slightly reduced in diameter as indicated by the numeral 20 and beyond its reduced portion is spherically rounded as indicated by the numeral 21 so as to provide an annular beveled bearing surface which is to have a fluid-tight fit in an element of the coupling section to be presently described. The bore of the pipe section 7 is likewise at this end slightly flared as indicated by the numeral 22.

The coupling head B is, as in the case of the coupling head A, provided upon its attaching base 2 with one or more bodies 23 corresponding to the body 2 above described and the said body 23 is formed with a bore 24 into one end of which is threaded the respective service pipe indicated by the numeral 25. At its other end the bore 24 is interiorly threaded as indicated by the numeral 26 and fitted therein is a spud 27 having a polygonal body portion 28 for the engagement of a wrench whereby it may be turned into place and provided at its outer end with an annular spherically rounded bearing surface 29 corresponding to the surface 21 at the outer end of the pipe section 7. The spud has a bore indicated by the numeral 30 and which bore is slightly flared at its outer end as indicated by the numeral 31 but is throughout the remainder of its length of substantially the same diameter as the bore of the respective service pipe 25.

The coupling section which is to be interposed between the coupling heads above described is indicated in general by the numeral 32 and comprises a suitable length of pipe 33 the bore of which is indicated by the numeral 34 and is of substantially the same diameter as the bores of the service pipes 5 and 25 and the bore of the pipe section 7. The pipe section 33 is exteriorly reduced at each end as indicated by the numeral 35 and fitted onto the ends thereof are socket members 36 and 37. These socket members are substantially identical in their construction and are designed to receive respectively the beveled outer end of the pipe section 7 and the beveled outer end of the spud 27, as clearly shown respectively in Figs. 1 and 4 of the drawings. Each of the socket members comprises an annular body having a bore or central opening 38 preferably increased in diameter as indicated by the numeral 39 to provide a shoulder 40 against which the respective end of the pipe section 33 abuts, the socket member being held in place in any suitable manner. The opening 38 communicates with the socket proper of the said member, which socket is indicated by the numeral 41 and which is of general concave form and of a diameter and depth to have its wall coöperate with the beveled surfaces 21 and 29 of the pipe section and spud, respectively, in all reasonable relative angular positions of the parts with relation to one another. Thus, as will be evident from inspection of Figs. 2 and 6, the coupling sections may be considerably angularly displaced with relation to the lines of extent of the service pipes when the coupling heads of the device are relatively laterally displaced, and yet fluid-tight connection will be preserved between the parts so that there will be an uninterrupted flow of fluid through the members comprising the coupling.

It will be observed that in effect a ball and socket connection is provided between the coupling section and the coupling heads and it is desirable that the socket elements be located at the ends of the coupling section 32 rather than upon the ends of the pipe section 7 and spud 28 for the reason that if the coupling section 32 were provided with exposed bevel or ball ends, the surfaces of these ends would be liable to become scarred, dented or otherwise injured in the event of accidental dropping of the coupling section or its rough handling. As it is, however, the bearing surfaces of the socket members are not so exposed and even should the coupling section be dropped these surfaces would neither of them be liable to injury. In the use of the invention, the locomotive and tender will, of course, be mechanically coupled by the usual draw bar connections which more or less limit the relative movement of the locomotive and tender both as regards lateral relative displacement and separation and approach. Therefore when coupling sections 32 of a suitable length are provided, they may be interposed between the coupling head and will be securely held in place and in an intermediate position, through the influence of the spring or springs 15. However, when it becomes necessary to remove any one of the coupling sections 32, this may be readily accomplished by exerting a thrust upon the section in the direction of the spring and against the tension of the latter and simultaneously disengaging the end of the coupling section from the respective spud 27.

If desired, a suitable wearing ring 42 may be employed in connection with each socket member upon the coupling section, the ring being disposed within an annular groove or recess 43 formed in the face of the socket member as clearly shown in Fig. 3 of the drawings.

The object in view in reducing in diameter the pipe section 7 as at 20, is to insure sufficient tension at the joint 41 under all internal pressure conditions of the fluids to be conducted. The diameter of the reduced portion 20 is somewhat less than the diameter of the cylinder in which the pipe section 7 telescopically moves and thus the effective area of the end of the pipe section 7 which is inserted in the cylinder is greater than the maximum effective area of the reduced portion of the section 7. Consequently, the tendency is for the pressure in the system to thrust the pipe section 7 against the member 36 and maintain a tight joint at 41 regardless of the tension of the spring 15. In fact the chief purpose of the spring is to maintain the packing in suitably compressed condition and to maintain a sufficient tension to prevent accidental disengagement of the coupling sections should the fluid pressure in the coupling be reduced to that of the atmosphere.

It will be understood that the members of the coupling may be reversed and that two of the members A may be employed if desired instead of one of these members and one of the members B.

Having thus described the invention, what is claimed as new is:

1. In a train pipe coupling, a coupling head having a bore, a pipe section telescopically fitted in the bore, the pipe section having a longitudinal groove, and a stud screw threaded through the wall of the coupling head and having its stud end engaging in the said groove whereby to limit the sliding movement of the pipe section in the said bore and to prevent its rotation therein.

2. In a train pipe coupling, a coupling head having a bore, a lining removably fitted into the bore, a pipe section telescopically fitted into the bore within the lining, and a common means for limiting the movement of the pipe section and for retaining the lining within the bore.

3. In a train pipe coupling, a coupling head having a bore, a lining bushing removably fitted into the bore, the pipe section having a longitudinal recess, and a stud element removably fitted through the wall of the bore and projecting through the wall of the bushing and into the said recess whereby to limit the movement of the pipe section and to retain the bushing within the bore.

4. In a train pipe coupling, a coupling head having a bore, a pipe section telescopically fitted in the bore and provided with a circumscribing outwardly beveled shoulder, an inwardly beveled packing element disposed to surround the pipe section within the bore and seating against the shoulder, an outwardly beveled ring surrounding the pipe section and engaging against the packing element, and a spring within the bore bearing against the said ring whereby to compress the packing and also whereby to yieldably hold the pipe section in a projected position.

5. In a train pipe coupling, a coupling head having a bore, a pipe section telescopically fitted in the bore and exteriorly reduced in diameter at its inner portion thus providing a shoulder, the said shoulder being beveled, a beveled face ring disposed to surround the reduced portion of the pipe section, a packing gasket having beveled faces, the said gasket being disposed to surround the reduced portion of the pipe section between the ring and the said shoulder, and means exerting pressure against the ring and forcing the pipe section in an outward direction.

In testimony whereof I affix my signature.

GEORGE A. SAGER. [L. S.]